Feb. 23, 1971  J. P. GOODMAN  3,564,859

METHOD OF RESETTING UTILITY POLES OR THE LIKE

Filed April 1, 1969

INVENTOR.
Jack P. Goodman
BY
*Richard D. Law*
ATTORNEY

United States Patent Office 3,564,859
Patented Feb. 23, 1971

3,564,859
METHOD OF RESETTING UTILITY POLES OR THE LIKE
Jack P. Goodman, 2500 S. Tejon,
Englewood, Colo. 80110
Filed Apr. 1, 1969, Ser. No. 812,254
Int. Cl. E02d 5/74, 27/00
U.S. Cl. 61—53.5                                    6 Claims

ABSTRACT OF THE DISCLOSURE

A method of resetting utility poles or the like which have become canted or tilted from original vertical position, straightens the pole and injects a foamable synthetic resin into the remaining voids in the ground surrounding the pole and into any cracks or crevices in the pole, so that on expansion of the resin the voids, cracks and crevices are all completely filled, most of the end of the pole underground is covered with the resin, and the cured resin holds the pole vertically.

---

Utility poles are used throughout the world for holding various metal conductors or wires of one sort or another above the ground. A commonly used utility pole is a wooden pole which is normally set in a hole dug with an auger, the removed dirt is back-filled dirt is tamped to set the pole. The tamping of the dirt into the space around the pole does not compact the earth around the hole, and after a period of time a substantial percentage of the poles lean or are canted by either the weight of the wires, wind, snow and ice or the like at an angle beyond vertical. When the angle becomes too great it is necessary to reset or replace the poles to prevent it from falling completely.

Many utility poles become loose in the ground due to poor original installation or from action of weather as wind and heavy loads due to ice and snow on lines. Poles in this condition will usually have a void or voids between the pole and side wall of the hole. The void may be small all around pole or in many cases one void will be on one side of pole near ground level and at opposite side near bottom of the hole. In all cases the resetting of a pole is complicated and expensive process. The ground around the hole must be excavated out and pole retamped in upright position. Generally, there is not enough room between the pole and side wall for a tamping tool or the void near the bottom of the hole is inaccessible due to the ground above the void on that side of the pole.

A pole which leans or cants in its hole pivots around a point below the surface leaving a void above the pivot point on one side of the pole and below the pivot point on the opposite side of the hole from the way the pole leans. The void or voids around a loose pole collect water and hold moisture, deteriorating the pole and further loosening the side wall. If this condition is not corrected the pole life will be greatly reduced or the pole can become so loose it will lean to one side or even fall to the ground.

According to the present invention I have provided a method of resetting a pole, in which a canted pole is straightened and foamable liquid resin mixture is injected into the voids around the pole, so that on foaming the voids are completely filled. The resin actually compresses into the earth, of the side wall of the voids, enters into the cracks and crevices of the pole and generally surrounds the bottom of the pole with a protective coating of plastic. The plastic adheres tightly to the pole and in most cases seals the end of the pole. It leaves a mass of plastic which must move with the pole thereby presenting a larger projected surface against pole movement, and further providing a more rigid structure.

Included among the objects and advantages of the present invention is a method of resetting poles which have leaned, which is preformed simply, speedily and inexpensively. The residual spaces or voids from resetting the pole from a leaning position to a vertical position are completely filled with a foamed plastic which rapidly sets, completely filling the void between the poe and the dirt and exerting the around the voids and essentially coating the bottom of the pole with the resin to thereby further protect the pole.

A further object of the invention is to provide a means for resetting poles which have leaned to using a synthetic resin to fill voids on realigning a pole to vertical so that the voids around the pole are completely filled.

Another object of the invention is to provide a method of setting a pole or post which has leaned from its initial vertical position and to provide further protection for a major portion of the post under ground.

These and other objects and advantages of the present invention may be readily ascertained by referring to the following description and appended illustrations in which.

Figure 1:
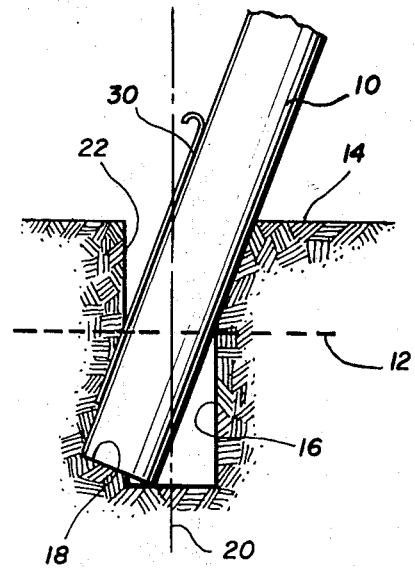
FIG. 1 is a generally schematic, cross-sectional view of a pole in the ground in leaning position from an original vertical position.
Figure 2:
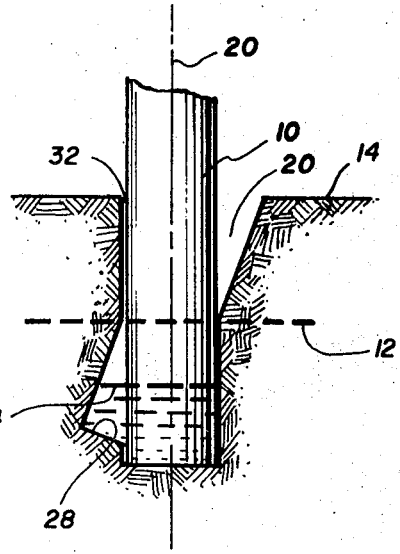
FIG. 2 is a cross-sectional view of the hole with a straightened pole showing a general hole configuration after such straightening.
Figure 3:
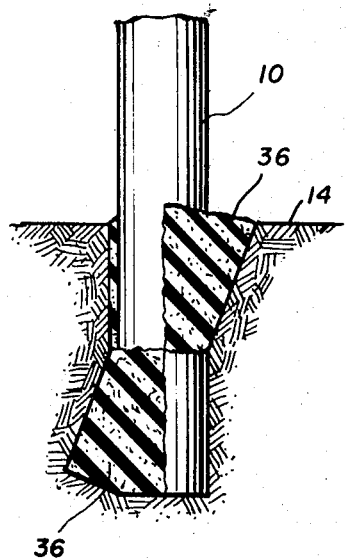
FIG. 3 is a cross-sectional view of a reset pole with a cured foam plastic fill according to the invention.
Figure 4:
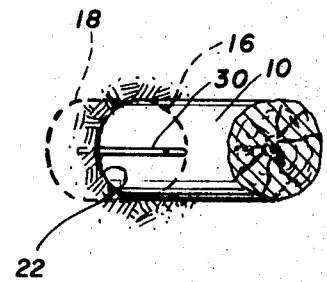
FIG. 4 is a top plan view of a pole in leaning position illustrating a step in the method of the invention.

In the selected illustrations in the drawings, a pole 10 is shown canted to its original vertical position in FIG. 1. The pole has a general pivot point along line 12 which lies below the surface 14 of the ground. An original vertical hole 16 initially provided support for the pole but on leaning a void is left in the bottom of the hole when the bottom 18 of the pole moves out of the riginal center line 20 of the pole and the hole. On the oposite, upper side of the pole is another void 22 which is left from the top of the pole moves into the canted position. The spaces or voids thus extend either all the way around or a substantial distance around the pole. When the pole 10 is moved back into vertical position (FIG. 2), which is generally its original position along the center line 20, a void 26 is left at the upper part of the hole and a void 28 is left at the lower part of the hole, again both voids extend a substantial distance around the pole. The pole can be straightened by piking or moved into vertical position with a derrick. The pole may be held in position with pole pikes and reset by the present method.

According to the method of the present invention, prior to straightening, a rod or pipe 30 is forced down along the pole, shown in FIG. 1, towards the pole butt. When the pole is returned to vertical position, the rod moves with the pole. On removal of the rod, a small passage 32 (FIG. 2) is left along side the pole into residual void 28 at the bottom. A foamable liquid resin is poured into the hole to fill the void 28 to a level 34 which when the resin is completely foamed fills all the lower voids and extends a substantial distance around the pole. Preferable, the foamed resin should extend up at least to about the pivot line 12, which permits addition resin to be poured into the void 20 for filling the upper void. If the volume of the voids can be ascertained, a sufficient amount of resin may be injected into the void to completely fill both the lower and the upper void, and when the resin as fully expanded and set it leaves a hardened mass 36 at the bottom which presses into the dirt surrounding the pole and into the cracks and crevices of the pole. All that is necessary is that the pole be held for the time to cure the resin, usually from 10–20 minutes depending on the ingredients in the resin.

One very effective synthetic resin useful for the purpose is polyurethane which has been mixed with a blowing agent, liberating a gas during setting of the resin, foaming the same and curing agents set the foamed resin into a hardened cellular mass. One foaming agent for polyurethane is a polyisocyanate, and the chemical reaction is between the polyurethane resin, water and the polyisocyanate producing carbon dioxide during the polymerization or setting of the polyurethane resin.

In place of polyurethane other types of plastics or resins may be used, and these include phenol-aldehyde and urea-aldehyde resins, polystyrene, polyethylene, polyvinyl chlorides, cellulose acetate, both natural and synthetic elastomers, etc. Generally, cost of materials is a main consideration, but since only a few pounds of resin is needed, overall cost of pole setting far exceeds the resin cost. Blowing agents include ammonium compounds, inorganic carbonates, and organic blowing agents conventionally used in the resin or plastic art. The expanded foam generally forms a cured mass having a strength of 80–100 pounds per square inch, and a density of from 3–9 pounds per cubic foot. These qualities are determined by the amount of blowing agent, etc. in the resin. Additives such as accelerators, may be used where desired to change the curing time. In some instances a pole loosens completely around its base by back and forth and sidewise movement. This condition is readily corrected by piking the pole vertical, mixing the resin and foaming agent and then pouring the same in the void around the pole base.

While the invention has been illustrated by reference to a particular embodiment, there is no intent to limit the spirit or scope of the invention to the precise details so set forth except as defined in the following claims.

I claim:
1. A method of resetting a pole or the like which has tilted from its initial substantially vertical setting thereby leaving voids in and around the original ground space around the pole, comprising:
   (a) straightening said pole into substantially vertical position;
   (b) forming a passage from the earth's surface into the lowest void around said pole;
   (c) injecting sufficient liquid resin and foaming agent to completely fill the voids around said pole when said resin is foamed;
   (d) permitting said resin and foaming agent to react to foam, expand and fill all voids around said pole and to adhere to the portions of said pole exposed to said foam;
   (e) and permitting said foamed resin to set into a hardened mass and support said pole in its reset position.

2. A method according to claim 1 wherein the forming of a passage to the lowest void is by inserting a rod along the top side of the pole toward the bottom thereof, and withdrawing said rod therefrom on straightening the pole.

3. A method according to claim 1 wherein liquid resin and foaming agent are injected into the lower voids around said pole and permitted to set, and then additional liquid resin and foaming agent injected into the upper voids and permitted to set.

4. A method according to claim 1 wherein said pole is reset in approximately its original setting forming an undercut void adjacent the bottom of said pole, and on foaming said resin fills said void.

5. A method according to claim 1 wherein said passage is sufficiently large to pass liquid resin and foaming agent to the lower voids around said pole and permitted foamed resin to flow upwardly toward the surface of the surrounding ground.

6. A method according to claim 1 wherein said liquid resin is a polyurethane, and said foaming agent is a polyisocyanate.

References Cited

UNITED STATES PATENTS

| | | | |
|---|---|---|---|
| 681,738 | 9/1901 | Roy | 61—53.6X |
| 3,380,258 | 4/1968 | Young | 264—45X |
| 3,439,075 | 4/1969 | Bauer et al. | 264—45 |
| 3,444,279 | 5/1969 | Dost | 264—45 |

JACOB SHAPIRO, Primary Examiner

U.S. Cl. X.R.

61—56.5; 52—170, 309, 742; 264—45